UNITED STATES PATENT OFFICE.

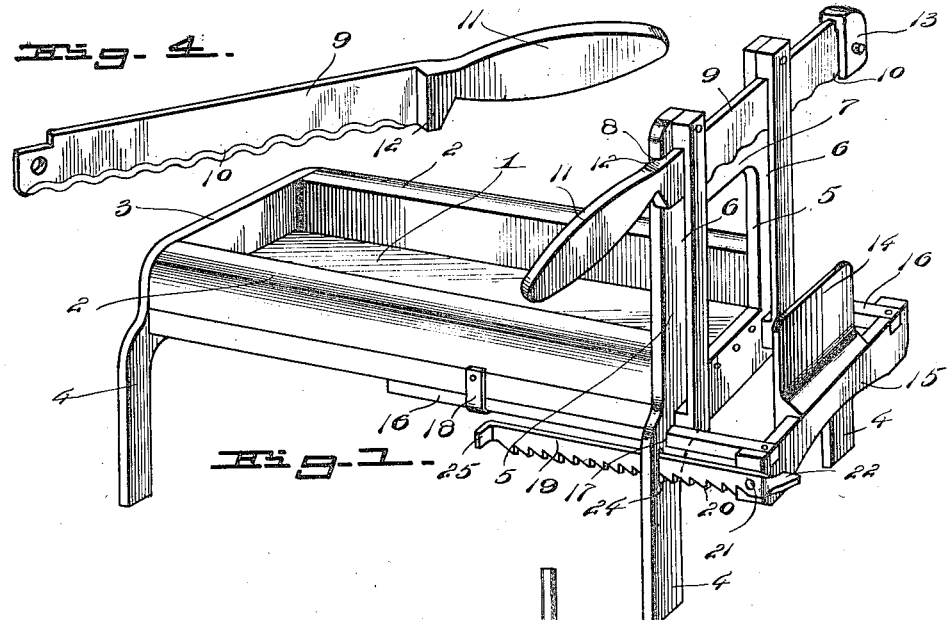
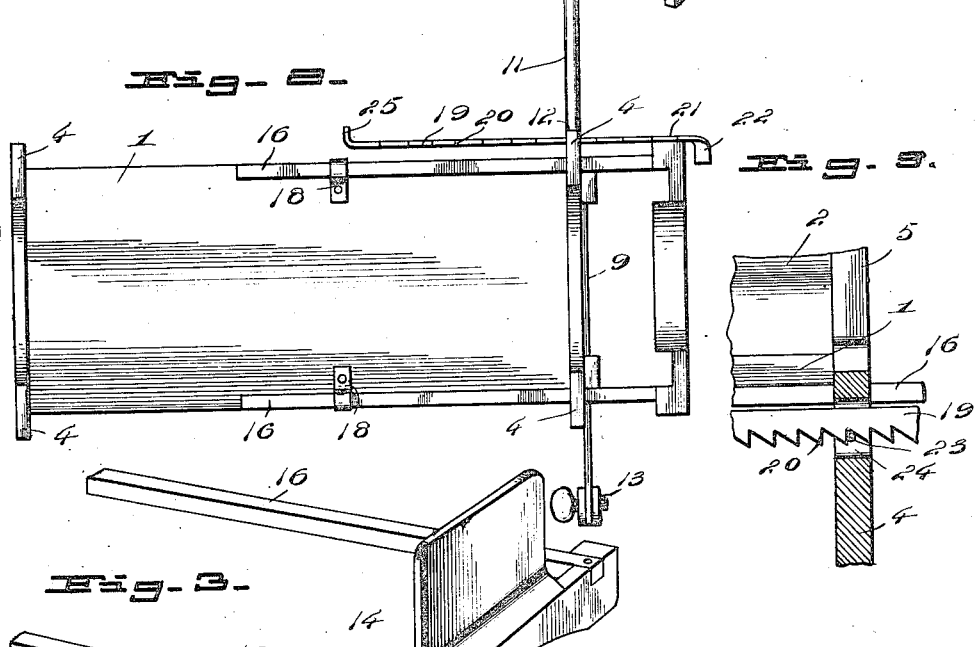

WILLIAM H. ITALY, OF BROOKLYN, NEW YORK.

BREAD-SLICER.

1,064,650.

Specification of Letters Patent. Patented June 10, 1913.

Application filed July 2, 1912. Serial No. 707,270.

*To all whom it may concern:*

Be it known that I, WILLIAM H. ITALY, a citizen of the United States, residing at Brooklyn, in the county of Kings and State of New York, have invented new and useful Improvements in Bread-Slicers, of which the following is a specification.

This invention relates to bread slicers, the object in view being to provide a simple device, whereby a loaf of bread may be quickly sliced by an inexperienced person, and the slices made of uniform thickness, the thickness being variable at the will of the operator, by the adjustment of a gage used in connection with the bread supporting table and knife which latter is mounted to reciprocate in suitable guide ways.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is a perspective view of a bread slicer, embodying the present invention. Fig. 2 is a bottom plan view thereof. Fig. 3 is a perspective view of the gage. Fig. 4 is a perspective view of the knife. Fig. 5 is a detail section showing the rack and pin connection between the gage and frame.

The bread slicer of this invention comprises essentially a table 1 of a size adapted to receive a loaf of bread, the same being provided at opposite sides with upstanding flanges 2, and provided at one end with another upstanding flange 3, the device also comprising a frame embodying supporting legs 4 of any suitable length for sustaining the table 1 at the desired elevation above the support on which the slicer rests.

At one end, parallel uprights 5 extend upward from the table 1 at opposite sides thereof, both of the said uprights being longitudinally slotted, as shown at 6. The slotted uprights 5 are shown as formed integrally with the supporting legs at that end of the bread table, this being the preferred embodiment of the invention, although it will be apparent that the slotted uprights 5 may be formed separately from said legs, if so desired. The uprights are further connected, intermediate their ends, by a cross bar 7, to more effectively brace the same, and one of said uprights is provided near its upper end with a recess 8, the purpose of which will hereinafter appear.

In connection with the slotted uprights above referred to, I employ a reciprocatory bread cutting knife 9, preferably of the type having a serrated or scalloped cutting edge, as shown at 10. At one end of the blade of the knife, there is a suitable handle 11, and adjacent to the junction of the handle with the blade, a shoulder 12 is provided which is adapted to be received in the recess 8 above referred to, for the purpose of sustaining the knife in an elevated position when temporarily out of use. At its opposite end, the blade is provided with a laterally projecting stop 13, said stop in conjunction with the shoulder 12 serving to limit the back and forth movement of the knife blade in the slotted uprights. The knife is thus permanently attached to the uprights, and may only be removed by detaching the stop 13, which is held by a pin or screw through a hole in the end of the knife blade, as shown.

14 designates a gage which is adjustable toward and away from the plane of movement of the bread cutting knife 9. This gage 14 is mounted upon and extends from a cross head 15, and the latter has secured to the opposite ends thereof parallel bars 16 which extend inward perpendicularly to the cross head 15 and pass through guide openings 17 in the frame, and also through other guides or loops 18 secured to the bread supporting table, and lying beneath the same.

In order to sustain the slice gage at any desired distance from the plane of the cutting knife, a rack bar 19 with saw shaped teeth 20 is pivotally connected, at 21, to the cross head 15, and is provided at its outer end with a finger piece 22, enabling said rack bar to be moved upward and downward to a limited extent to move the same out of engagement with the keeper pin 23 which is arranged in a slot 24 in the frame, or one of the legs of the device. At its opposite end, the rack bar is provided with a stop shoulder 25 to prevent the entire withdrawal of the gage from the frame of the device.

From the foregoing description, it will now be seen that the gage 14 may be adjusted to any desired distance from the plane of operation of the knife blade, for the purpose of regulating the thickness of the slices, it being understood that when the knife blade is raised, the loaf of bread is pushed under the knife and up against the gage 14, after which the knife is reciprocated in the operation of cutting a slice from the loaf. In this way, all of the slices are of uniform thickness, and the thickness may be varied by means of the gage, so as to obtain any desired number of slices from a loaf of given length.

What is claimed is:

The combination of a frame, a bread supporting table, longitudinally slotted uprights at opposite sides of one end of the table, a bread cutting knife mounted to reciprocate through said uprights, a slidable gage, parallel bars extending perpendicularly therefrom, the frame being provided with guideways through which said bars are movable, a rack bar pivotally attached to the gage and slidable through an opening in the frame, a fixed pin on the frame with which said rack bar engages, a guide engaging stop at one end of said rack bar, and a finger piece at the opposite end of said rack bar projecting beyond the pivot of the rack bar.

In testimony whereof I affix my signature in presence of two witnesses.

WILLIAM H. ITALY.

Witnesses:
WM. T. HICKELTON,
JNO. E. BAUM.